(12) United States Patent
Mavroudakis et al.

(10) Patent No.: US 7,026,980 B1
(45) Date of Patent: Apr. 11, 2006

(54) MISSILE IDENTIFICATION AND TRACKING SYSTEM AND METHOD

(75) Inventors: Peter J. Mavroudakis, Hightstown, NJ (US); Jeffrey B. Boka, Lumberton, NJ (US); Naresh R. Patel, Bellmawr, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/072,902

(22) Filed: Mar. 4, 2005

(51) Int. Cl.
*G01S 13/72* (2006.01)

(52) U.S. Cl. .................. 342/90; 342/95; 342/96; 342/97; 342/101; 342/195

(58) Field of Classification Search .............. 342/90, 342/95–101, 106–108, 115, 159–162, 189, 342/192, 194–196
See application file for complete search history.

(56) References Cited

U.S. PATENT DOCUMENTS

| | | | | |
|---|---|---|---|---|
| 5,296,861 | A | * | 3/1994 | Knight .................. 342/357.11 |
| 5,341,142 | A | * | 8/1994 | Reis et al. .................... 342/64 |
| 5,537,118 | A | * | 7/1996 | Appriou ...................... 342/95 |
| 5,959,574 | A | * | 9/1999 | Poore, Jr. .................... 342/96 |
| 5,960,097 | A | * | 9/1999 | Pfeiffer et al. .............. 382/103 |
| 6,011,507 | A | * | 1/2000 | Curran et al. ................. 342/70 |
| 6,104,336 | A | * | 8/2000 | Curran et al. ................. 342/70 |
| 6,262,680 | B1 | * | 7/2001 | Muto .......................... 342/74 |
| 6,404,380 | B1 | * | 6/2002 | Poore, Jr. .................... 342/96 |
| 6,750,806 | B1 | * | 6/2004 | Fischer ....................... 342/96 |
| 2002/0008657 | A1 | * | 1/2002 | Poore, Jr. .................... 342/96 |
| 2005/0128138 | A1 | * | 6/2005 | McCabe et al. ............ 342/195 |

OTHER PUBLICATIONS

"Adaptive interacting multiple model tracking of manuevering targets", Layne, J.R.; Piyasena, U.C. Digital Avionics Systems Conference, 1997. 16th DASC., AIAA/IEEE vol. 1, Oct. 26-30, 1997 Ps:5.3-16-23.*

"Fuzzy multiple model tracking algorithm for manoeuvring target", Dongguang Zuo; Chongzhao Han; Zheng Lin; Hongyan Zhu; Han Hong Information Fusion, 2002. Proceedings of the Fifth International Conference on vol. 2, 2002 Ps: 818-823.*

"Efficient robust AMF using the FRACTA algorithm", Blunt, S.D.; Gerlach, K.Aerospace and Electronic Systems, IEEE Transactions on vol. 41, Issue 2, Apr. 2005 Page(s): 537-548.*

* cited by examiner

*Primary Examiner*—John B. Sotomayor
(74) *Attorney, Agent, or Firm*—Duane Morris LLP

(57) ABSTRACT

Sensors determine the kinematic measurements of a boosting missile, and the information is applied to a plurality of pairs or sets of filters, one of which is matched to the characteristics of a particular target type, and the other of which is general, and not matched to a particular target, for producing from each filter of the set missile position, velocity, acceleration, and specific mass flow rate states, and covariances of those states. From the filtered information, the estimates are made of at least missile mass flow rate, thrust, velocity at stage burnout, and remaining burn time. The likelihood is computed that the states and covariances from the filter sets represent the same target. The largest likelihood is selected as representing the target. In one mode, the estimated parameters are weighted and summed for a composite likelihood.

6 Claims, 2 Drawing Sheets

MISSILE IDENTIFICATION AND TRACKING SYSTEM AND METHOD

FIELD OF THE INVENTION

This invention relates to the identification and tracking of a missile, especially a missile in its boost phase.

BACKGROUND OF THE INVENTION

Tracking and prediction of the future location of missile targets is at the forefront of antiballistic missile defense. Existing methods, such as Interactive Multiple Model (IMM) use multiple hypotheses, and use pattern recognition schemes which compare kinematic information about the target, such as time history of altitude, ground path, and flight angle versus time, with a template. This prior art requires large numbers of templates, as for each target there are altitude, flight path, ground path. The templates are based on the target taking a nominal path, but the target motors may burn long or short, thereby not matching the templates. The enemy may change any of the parameters of the flight path, such as lofting or depressing the flight path, so as to avoid matching a template. A template technique, to be effective in view of these possible changes, would require a very large number of templates, including a large number for each type of target. When there are very large numbers of templates, there will likely be an overlap between the targets, so that it becomes difficult to distinguish between a given target that is lofted and another target type that is depressed. For example, a target may have an engine which runs "hot" or "cold," and it may be directed along a flight path which is either depressed or lofted, thus requiring a very large number of templates to handle even one target. When the target has multiple stages, each stage may itself run hot or cold, and there are even more variations. The large number of variations makes the use of kinematic templates very complex. In addition, the large number of templates may result in overlap of the kinematic features among various different templates, thereby leading to indeterminate results. The potential inaccuracies are exacerbated by variations of the kinematics attributable to inaccurate time after lift-off (TALO).

Improved missile identification and tracking systems and methods are desired.

SUMMARY OF THE INVENTION

The invention uses the underlying physics of the target rocket and its engine to attempt to identify the type of target, and thereby allow the target path to be determined, rather than using the kinematics of the target. This tends to make the identification and tracking independent of target energy management in the form of trajectory lofting or depressing.

More specifically, sensors determine the states of a boosting missile, and the information is applied to a plurality of pairs or sets of filters, one of which is matched to the characteristics of a particular target type, and the other of which is general, and not matched to a particular target (and thus the general filter makes no assumptions about the target), for producing from each filter (the particular and the general) of each set information including missile position, velocity, acceleration, and specific mass flow rate states, and covariances of those states. From the filtered information, the estimates are made of at least missile mass flow rate, thrust, velocity at stage burnout, and remaining burn time. The likelihood is computed that the states and covariances from the particular and general filters of each filter set represent the same target. The largest likelihood is selected as representing the target. In one mode, the estimated parameters are weighted and summed for a composite likelihood.

A method according to an aspect of the invention is for tracking a target, which may be a boosting target such as a ballistic missile in its boost phase. The method comprises the steps of sensing information about the target, as for example by means of a radar system or overhead imaging satellite. The information should comprise at least one of (a) target position over time and (b) target positional angle as a function of time relative to the sensor, coupled with sensor position. The information is applied to a plurality of filter sets, where each filter set includes (a) a special filter matched to the parameters of a one predetermined possible type of target and (b) a general filter which is of a more general type. The general filter does not include specifics of possible types of target, and thus the general filter makes no assumptions about the target. The application of the information to each filter set produces, from each of the special and general filters, target position, velocity, acceleration, and specific mass flow rate states, and covariances of those states. From the states and covariances of the states of the information from the filter set, calculations are performed to determine at least (a) estimated actual mass flow rate, (b) estimated thrust, (c) estimated velocity at staging burnout (burnout of the current stage), and (d) estimated remaining burn time for the current stage. Other parameters may also be calculated, such as, for example, (e) estimated specific impulse (f) estimated mass at burnout of the current stage, and (g) estimated initial mass of the current stage. The likelihood is computed that the states and covariances produced by the special and general filters of each of the sets of filters represent the same target. From among the plurality of likelihoods calculated for all the filter sets, that one likelihood which has the greatest magnitude is selected as representing the target.

In a particularly advantageous mode of a method according to an aspect of the invention, the step of computing the likelihood in relation to each of the sets of filters includes the steps of multiplying each of the mass flow rate, thrust, and state likelihoods (position, velocity, acceleration, and specific mass flow rate) by at least one weighting factor to produce weighted parameters. The weighted parameters are then added together to produce a composite likelihood. Removal of sensor biases may also be performed.

DESCRIPTION OF THE INVENTION

Figure 1:
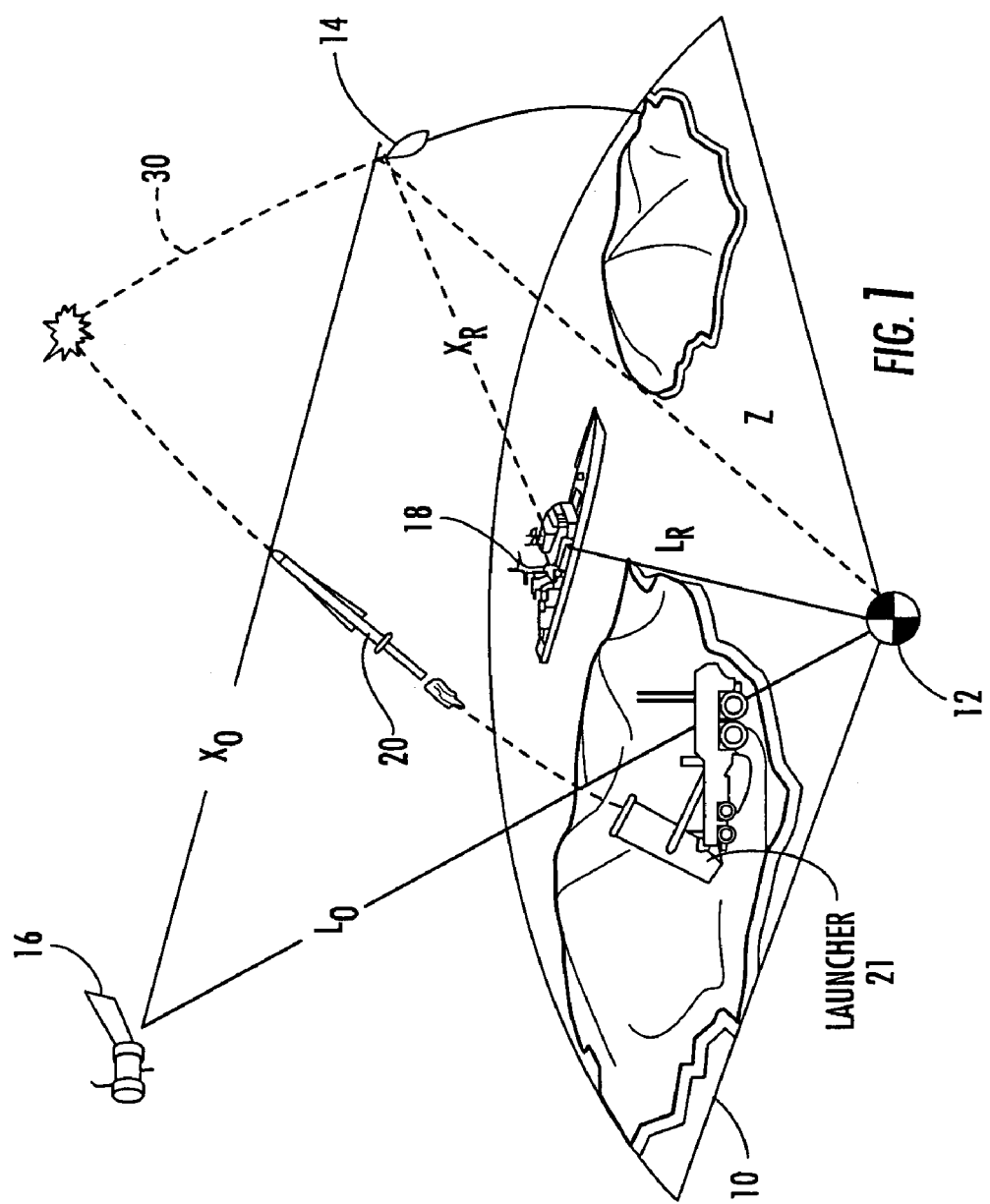
FIG. 1 is a simplified diagram illustrating the locations relative to Earth of a target, sensing spacecraft, shipborne sensing radar, and a land-based interceptor which may use the invention.

FIG. 1 is a simplified diagram illustrating the locations relative to Earth 10 and the Earth's center 12 of a target 14, sensing spacecraft 16, shipborne sensing radar 18, and a land-based interceptor 20 using launcher 21 which may use the invention. In FIG. 1, the satellite 16 may include an overhead non-imaging infrared (ONIR) sensor, and X0 represents the distance from ONIR 16 to the target. Distance $X_R$ represents the distance from the shipborne radar 18 to the target, distance $L_R$ represents the radial distance from the shipborne radar 18 to the Earth's center 12, LO represents the radial distance between the Earth's center 12 and the ONIR spacecraft 16, and distance Z represents the radius between the target 14 and the Earth's center 12.

Figure 2:
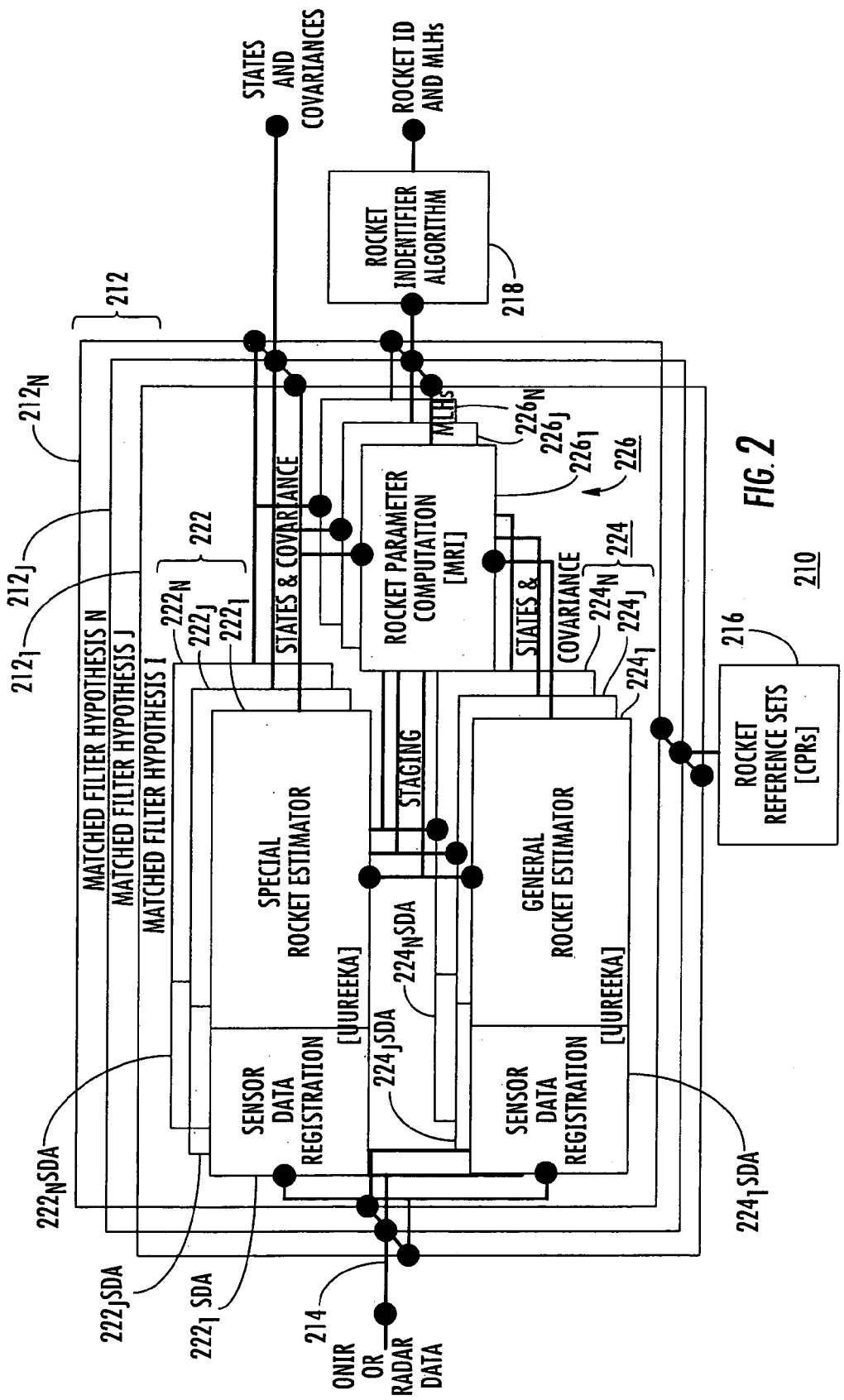
FIG. 2 is a simplified functional diagram of information processing according to an aspect of the invention.

FIG. 2 is a functional block representation of a Missile Dynamics "Optimal" Tracking System (MDOTS) according to an aspect of the invention. MDOTS taken as a whole incorporates a multi-hypothesis matched filter arrangement that concurrently performs sensor bias registration, sensor measurement fusion, target state estimation, target parameter estimation, and target identification. The multi-hypothesis filters include estimation states for overhead non-imaging infrared and radar angular registration biases and for specific mass flow rate of the target. The state estimates are used to extract estimates of the target's actual mass flow rate and thrust, and these estimates are compared for each hypothesis in a maximum likelihood sense to identify the target.

Target dynamics modeling within the MDOTS track filter arrangement is based on target physical parameters and the fundamental rocket equation, rather than on target kinematics (acceleration and velocity templates). These characteristic physical parameters include specific impulse, mass flow rate and initial mass. A separate instantiation of the MDOTS matched filter is created for each potential target type and stage (that is, a three-stage rocket target would include a separate instantiation for each stage), incorporating its physical parameters. These constitute the multiple hypotheses considered by MDOTS. Ultimately, the state estimate and physical parameters estimates associated with each matched filter hypothesis are used to identify the "correct" hypothesis, indicating the target type and stage.

MDOTS processes target measurement data from an arbitrary number of radars and Overhead Non-Imaging Infrared (ONIR) satellites. Radar measurements include target range, azimuth and elevation, and radar position. ONIR measurements include target line-of-sight direction, and ONIR satellite position. MDOTS addresses out-of-sequence measurements, caused by measurement processing and transmission delays, by forward or backward propagating the filter states to the current measurement time. MDOTS also incorporates angular misalignment states for each reporting radar and ONIR, permitting all the data to be fused in a manner that is transparent to the overall state estimation process. These states provide MDOTS with the ability to resolve "conflict" in the target state estimation process by providing a buffering effect between the various reporting sensors, mitigating the effect of registration bias misalignments inherent in measurements from different sensors.

In addition to target tracking, MDOTS calculates the burnout time of the target's current stage based on the current velocity estimate and the expected burnout velocity. This enables staging logic associated with or "within" the track filter to anticipate staging events by adjusting state covariances and resetting state variables (specifically, angle-of-attack and specific mass flow) once a staging event is complete. The filters predict when burn-out will occur. Within a window about that prediction time, the states and covariances are adjusted. Once out of the window, filter predicts the burn-out time of the next stage. One of the track filters associated with the correct target hypothesis will anticipate staging events correctly, resulting in the lowest target state estimation errors.

The MDOTS functional block diagram or algorithm 210 as illustrated in FIG. 2 includes a set 212 of N matched filter algorithms $212_1, \ldots, 212_j, \ldots, 212_N$. The ellipses indicate that additional or further matched filter algorithms may be used. The set 212 of matched filter algorithms receives sensor data measurements and associated measurement covariance data from external sensors by way of a data path 214, and rocket parameters for each matched filter hypothesis $212_1, 212_j, \ldots, 212_N$ from Rocket Reference Sets or databases 216. The output of each of the matched filter algorithms $212_1, \ldots, 212_j, \ldots, 212_N$ are the likelihoods associated with each hypothesis. The Rocket Identifier Algorithm 218 receives the likelihoods from the matched filter algorithm set 212 and uses a fuzzy logic algorithm to perform the rocket identification. The output of MDOTS 210 is the rocket identification (Rocket ID) in the form of the likelihoods (MLHs) associated with each hypothesis, and the state estimates from each hypothesis.

Inputs to the set 212 of matched filter hypotheses or algorithms of system 210 of FIG. 2 include time-tagged raw sensor measurements, which may include radar measurements, ONIR measurements, and smoothed position and velocity vectors. The smoothed position and velocity vectors are for the purpose of matched filter initialization. The minimum information is at least one of (a) target position as a function of time and (b) target angle as a function of time together with position of the observing sensor.

The Rocket Reference Sets of block 216 of FIG. 2 produces for each set $212_1, 212_j, \ldots, 212_N$, including the $j^{th}$ set, specific kinematic and dynamic parameters relating to each target class or type for each hypothesized rocket stage. This data includes for the $j^{th}$ hypothesis:

Nominal mass flow rate $\overline{M}^j$;
Nominal thrust $\overline{\tau}^j$;
Nominal specific impulse $\overline{I}_{sp}^{\,j}$;
Nominal velocity at burn-out $\overline{V}_{bo}^{\,j}$;
Nominal burn time $\overline{T}_{bo}^{\,j}$;
Nominal mass at burn-out $\overline{M}_{bo}^{\,j}$; and
Nominal initial mass $\overline{M}_{o}^{\,j}$.

In the arrangement of FIG. 2, each matched filter hypothesis or algorithm set $212_1, \ldots, 212_j, \ldots, 212_N$ includes three major component algorithms, namely a set 222 of Special Rocket Estimators, a set 224 of General Rocket Estimators, and a set 226 of Rocket Parameter Computations. In FIG. 2, matched filter hypothesis or algorithm $212_1$ includes Special Rocket Estimator $222_1$, General Rocket Estimator $224_1$, and Rocket Parameter Computation $226_1$. Similarly, matched filter hypothesis or algorithm $212_j$ includes Special Rocket Estimator $222_j$, General Rocket Estimator $224_j$, and Rocket Parameter Computation $226_j$, and matched filter hypothesis or algorithm $212_N$ includes Special Rocket Estimator $222_N$, General Rocket Estimator $224_N$, and Rocket Parameter Computation $226_N$. Naturally, when there are more matched filter hypotheses than the three illustrated, there will be more or additional constituent rocket estimators and parameter computers.

Each Special Rocket Estimator of set 222 and each General Rocket Estimator of set 224 includes a sensor data registration module. The sensor data registration modules associated with set 222 of Special Rocket Estimators are designated $222_X$SDA, and sensor data registration modules associated with set 224 of General Rocket Estimators are designated $224_X$SDA, where X corresponds to the subscript of the associated Rocket Estimator. Thus, the sensor data registration portion of special rocket estimator $222_1$ is designated $222_1$SDA, the sensor data registration portion of special rocket estimator $222_j$ is designated $222_j$SDA, and the sensor data registration portion of special rocket estimator $222_N$ is designated $222_N$SDA. Similarly, the sensor data registration portion of general rocket estimator $224_1$ is designated $224_1$SDA, the sensor data registration portion of general rocket estimator $224_J$ is designated $224_J$SDA, and the sensor data registration portion of general rocket estimator $224_N$ is designated $224_N$SDA.

It should be noted that although the general filters all use the same algorithms, they are initialized differently, according to each specific target parameter set, and also according to the staging events for each specific target type; thus the outputs of the general filters are not the same.

Each General Rocket Estimator $224_1, \ldots, 224_J, \ldots, 224_N$ of set 224 processes raw measurement data from any number of reporting radar or ONIR systems and estimates the rocket's state vector $\underline{s}_G(t)$ $$s_G(t) = \begin{Bmatrix} Z_G(t) \\ \dot{Z}_G(t) \\ \ddot{Z}_G(t) \\ b_G(t) \end{Bmatrix}$$

where $\underline{Z}_G$: Target position vector (m), Earth-centered, Earth-fixed (ECEF)

$\underline{\dot{Z}}_G$: Target velocity vector (m/sec), ECEF $\underline{\ddot{Z}}_G$: Target acceleration vector (m/sec 2), ECEF $b_G$: Specific mass flow rate (1/sec)

The state dynamics for the general rocket estimator is or are required to be of the form $$\dot{s}_G(t) = f(\underline{s}_G(t))$$

which implies that the dynamics are only a direct function (f( )) of the state $\underline{s}_G(t)$, and not of rocket parameters. The acceleration due to thrust should obey the rocket equation where $\dot{b}_G(t) = b_G(t)^2$, but no explicit filter modeling dependency with specific impulse or any other rocket parameter is permitted. Note that the rocket equation assumes Thrust acceleration is $$\ddot{x} = \frac{I_{sp} g_c \dot{m}}{m}$$

Mass flow rate ($\dot{m}$) is constant

Specific Impulse ($I_{sp}$) is constant $g_c$: standard gravitational acceleration (constant)

m: instantaneous mass.

Sensor (data) registration is accomplished by removing, in modules $224_X$SDA of FIG. 2, the measurement angular biases $\underline{\theta}(t) = (\delta\underline{\theta}_{o1}^T \ldots \delta\underline{\theta}_{oN}^T \delta\underline{\theta}_{r1}^T \ldots \delta\underline{\theta}_{rM}^T)$ as part of the estimation process from the N ONIR measurements reporting and the M radar measurements reporting.

Each Special Rocket Estimator $222_1, \ldots, 222_J, \ldots, 222_N$ of set 222 of Special Rocket Estimators processes raw measurement data from any number of reporting radar or ONIR systems and estimates the rocket's state vector $\underline{s}_S(t)$ $$s_S(t) = \begin{Bmatrix} Z_S(t) \\ \dot{Z}_S(t) \\ \ddot{Z}_S(t) \\ b_S(t) \end{Bmatrix}$$

where $\underline{Z}_S$: Target position vector (m), ECEF $\underline{\dot{Z}}_S$: Target velocity vector (m/sec), ECEF $\underline{\ddot{Z}}_S$: Target acceleration vector (m/sec^2), ECEF $b_S$: Specific mass flow rate (1/sec)

The state dynamics for the general rocket estimator is or are required to be of the form $$\dot{s}(t) = f(\underline{s}_S(t), I_{sp})$$

which implies that the dynamics are a direct function (f( )), of the state $\underline{s}_S(t)$, and rocket parameter specific impulse. The acceleration due to thrust should obey the abovementioned rocket equation where $\dot{b}_S(t) = b_S(t)^2$. Sensor registration is accomplished by removing the measurement angular biases $\underline{\theta}(t) = (\delta\underline{\theta}_{o1}^T \ldots \delta\underline{\theta}_{oN}^T \delta\underline{\theta}_{r1}^T \ldots \delta\underline{\theta}_{rM}^T)^T$ as part of the estimation process from the N ONIR measurements reporting and the M radar measurements reporting, as described for the case of the General Rocket Estimators.

The special filters are different from the general filters due to the inherent dependency to specific target parameters within the state dynamics. In particular, the special filter dynamics are dependent on the $I_{sp}$ of the target whereas the general filters have no dependency.

For a given hypothesis, the output of the special and general filters are basically the same, except the special filter states are biased towards the specific target assumed by the specific parameters (i.e. $I_{sp}$), whereas the general filter states are unbiased since the filter dynamics has no explicit dependency on the specific target. Given N sets of matched filter sets (one special and one general filter), only for the correct set (the one which corresponds to the true target) will the special and general states match, with the incorrect sets (the ones corresponding to other specific targets, not the true target) not matching. This match or mismatch between the special and general filter states is used to identify the target in the following steps.

Specific rocket parameters and their associated likelihoods are computed in the function represented by the Rocket Parameter Computation blocks of set 226. The inputs to the Rocket Parameter Computation blocks are the special and general matched filter states, $\underline{s}_S(t)$ and $\underline{s}_G(t)$ states, and the rocket reference set parameters from block 216, which are associated with each rocket hypothesis pertaining to the matched filter sets. Note that the rocket reference sets in block 216 are available to all blocks (222, 224, and 226) relating to a particular matched filter hypothesis (blocks 212). The outputs of Rocket Parameter Computation blocks $226_1, \ldots, 226_J, \ldots, 226_N$ are the likelihoods of each of the matched filter states with respect to each rocket hypothesis. That is, for each Special/General filter pair, such as pair $222_J$ and $224_J$, the parameters determined by the general filter and the special filter are compared, and the closeness of the comparison is an indication of how likely it is that the indicated parameters relate to the same target. If they are very close, the likelihood of the results representing the actual target are better than if the results are quite different. In addition, the outputs are the estimation of the specific dynamical and kinematical parameters relating to each target class or type for each stage with respect to the general and special filter states of each matched filter set j for each hypothesis i Estimated mass flow rate ($\dot{M}_G^{ji}$, $\dot{M}_S^{ji}$)
Estimated thrust ($\tau_G^{ji}$, $\tau_S^{ji}$)
Estimated specific impulse ($I_{SPG}^{ji}$, $I_{SPS}^{ji}$)
Estimated velocity at burn-out ($V_{BOG}^{ji}$, $V_{BOS}^{ji}$)
Estimated burn time ($T_{BOG}^{ji}$, $T_{BOS}^{ji}$)
Estimated mass at burn-out ($M_{BOG}^{ji}$, $M_{BOS}^{ji}$)
Estimated initial mass ($M_{OG}^{ji}$, $M_{OS}^{ji}$)

and their associated likelihoods with respect to each rocket hypothesis for the nominal rocket reference set parameters and with respect to each matched filter set. For example, for the $j^{th}$ matched filter set, for mass flow rate $\dot{\overline{M}}^i$ the likelihoods are computed as follows:

$$MLH^i(\dot{M}_G^j) = \frac{1}{\sqrt{2\pi P_{\dot{M}_G^{ji}}}}\left(e^{-\frac{1}{2}\left(\dot{M}_G^{ji}-\dot{\overline{M}}^i\right)^2 / P_{\dot{M}_G^{ji}}}\right)$$

$$MLH^i(\Delta\dot{M}_{GS}^{ji}) = \frac{1}{\sqrt{2\pi P_{\Delta\dot{M}_{GS}^{ij}}}}\left(e^{-\frac{1}{2}\left(\Delta\dot{M}_{GS}^{ji}\right)^2 / P_{\Delta\dot{M}_{GS}^{ji}}}\right)$$

where $\Delta\dot{M}_{GS}^{ji}=\dot{M}_G^{ji}-\dot{M}_S^{ji}$ and $P_{\Delta\dot{M}_{GS}^{ij}}$ is the covariance associated with $\Delta\dot{M}_{GS}^{ji}$ and $P_{\dot{M}_G^{ji}}$ is the covariance associated with $\dot{M}_G^{ji}-\dot{\overline{M}}^i$.

The rocket identifier block or algorithm 218 of FIG. 2 computes or determines the weighted likelihoods, WMLH, for each of the N filter hypotheses where the MLH for each matched filter set j and parameter sets 1 ... M is defined as

|  | Hypothesis 1 | ... | Hypothesis N |
| --- | --- | --- | --- |
| Parameter 1 | $MLH^{j1}(1)$ | ... | $MLH^{jN}(1)$ |
| Parameter 2 | $MLH^{j1}(2)$ | ... | $MLH^{jN}(2)$ |
| Parameter 3 | $MLH^{j1}(3)$ | ... | $MLH^{jN}(3)$ |
| . | . | ... | . |
| . | . |  | . |
| . | . |  | . |
| Parameter M | $MLH^{j1}(M)$ | ... | $MLH^{jN}(M)$ | where the parameter sets 1 ... M relate to MLH of the matched filter states and rocket reference set parameters (e.g. set 1=$b_S$–$b_G$, set 2=$\Delta\dot{M}_{GS}^{ji}$, etc.).

Then the weighted maximum likelihoods for each hypothesis k are defined by $$WMLH^k = \sum_{i=1}^{M}\sum_{j=1}^{N} MLH^{jk}(l)\frac{W_l}{\psi_{jl}\sigma_{kl}}, \quad k=1\ldots N$$

where $$\sigma_{kl} = \sum_{p=1}^{N} MLH^{kp}(l), \quad \psi_{jl} = \sum_{p=1}^{N} MLH^{pj}(l),$$

and $W_l$ are user-selected parameter weightings where $$\sum_{i=1}^{M} W_i = 1.$$

The maximum of the $WMLH^k$ is chosen as the correct hypothesis, thereby identifying the correct rocket type.

The outputs of the MDOTS arrangement 210 of FIG. 2 are (a) Rocket identification (ID), (b) Maximum likelihoods (MLHs) for all hypotheses, (c) track filter states for the general and special filters, $\underline{s}_G(t)$ and $\underline{s}_S(t)$, and their associated covariances, respectively.

The invention uses the underlying physics of the target rocket or missile (14) and its engine to attempt to identify the type of target, and thereby allow the target path (30) to be determined, rather than using the kinematics of the target. This tends to make the identification and tracking independent of target energy management in the form of trajectory lofting or depressing.

More specifically, sensors (16, 18) determine the states of a boosting missile, and the information is applied to a plurality of pairs (222, 224) or sets of filters, one of which (222) is matched to the characteristics of a particular target type, and the other of which (224) is general, and not matched to a particular target, for producing from each filter (the particular 222 and the general 224) of each set information including missile position, velocity, acceleration, and specific mass flow rate states, and covariances of those states. From the filtered information, estimates are made of at least missile mass flow rate, thrust, velocity at stage burnout, and remaining burn time. The likelihood is computed (226) that the states and covariances from the special (222) and general (224) filters of each filter set (224, 226) represent the same target (14). The largest likelihood is selected as representing the target. In one mode, the estimated parameters are weighted and summed for a composite likelihood.

A method according to an aspect of the invention is for tracking a target, which may be a boosting target such as a ballistic missile in its boost phase. The method comprises the steps of sensing information about the target, as for example by means of a radar system or overhead satellite. The information should comprise at least one of (a) target position over time and (b) target positional angle as a function of time relative to the sensor, coupled with sensor position. The information is applied to a plurality of filter sets, where each filter set including (a) a special filter matched to the parameters of a one predetermined possible type of target and (b) a general filter which is of a more general type. The general filter does not include specifics of possible types of target, and thus the general filter makes no assumptions about the target. The application of the information to each filter set produces, from each of the special and general filters, target position, velocity, acceleration, and specific mass flow rate states, and covariances of those states. From the states and covariances of the states of the information from the filter set, calculations are performed to determine at least (a) estimated actual mass flow rate, (b) estimated thrust, (c) estimated velocity at staging burnout (burnout of the current stage), and (d) an estimate of remaining burn time for the current stage. Other parameters may also be calculated, such as, for example, (e) estimated specific impulse (f) estimated mass at burnout of the current stage, and (g) estimated initial mass of the stage. The likelihood is computed that the states and covariances produced by the special and general filters of each of the sets of filters represent the same target. From among the plurality of likelihoods calculated for all the filter sets, that one which has the greatest magnitude is selected as representing the target.

In a particularly advantageous mode of a method according to an aspect of the invention, the step of computing the likelihood in relation to each of the sets of filters includes the steps of multiplying each of the mass flow rate, thrust, and states (position, velocity, acceleration, and specific mass flow rate) by at least one weighting factor to produce weighted parameters. The weighted parameters are then added together to produce a composite likelihood.

In conjunction with the determination of target type and parameters, the sensor biases may be ameliorated by removing the measurement angular biases $$\underline{\Theta}(t) = (\delta\underline{\Theta}_{o1}^T \ldots \delta\underline{\Theta}_{oN}^T \delta\underline{\Theta}_{r1}^T \ldots \delta\underline{\Theta}_{rM}^T)$$

from the measurements of the reporting sensors.

What is claimed is:

1. A method for tracking a target, said method comprising the steps of:
    sensing information about the target, which information comprises at least one of (a) position over time and (b) positional angle as a function of time relative to the sensor, coupled with sensor position;
    applying said information to a plurality of filter sets, each filter set including a special filter matched to the parameters of a one predetermined possible type of target and a general filter which is of a more general type, in that the general filter does not include specifics of the predetermined possible type of target, for producing, from each of the special and general filters, target position, velocity, acceleration, and specific mass flow rate states, and covariances of those states;
    calculating from the states and covariances of each of said set of filters at least (a) estimated actual mass flow rate, (b) estimated thrust, (c) estimated velocity at staging burnout, and (d) estimate of remaining burn time for that stage;
    computing the likelihood that the states and covariances produced by said special and general filters of each of said set of filters represent the same target;
    selecting as representing the target, from among said plurality of likelihoods, that one which has the greatest magnitude.

2. A method according to claim 1, wherein said step of calculating from the states includes the step of calculating (e) estimated specific impulse, (f) estimated mass at burnout of the current stage, and (g) estimated initial mass of the current stage.

3. A method according to claim 1, wherein said step of computing the likelihood in each of said set of filters includes the steps of:
    multiplying each of said mass flow rate, thrust, and states (position, velocity, acceleration, and specific mass flow rate) by at least one weighting factor to produce weighted parameters; and
    adding together said weighted parameters to produce a composite likelihood.

4. A method according to claim 1, further comprising the step of removing sensor biases by removing the measurement angular biases $$\underline{\Theta}(t) = (\delta\underline{\Theta}_{o1}^T \ldots \delta\underline{\Theta}_{oN}^T \delta\underline{\Theta}_{r1}^T \ldots \delta\underline{\Theta}_{rM}^T)$$

from the measurements of the reporting sensors.

5. A method for tracking a target, said method comprising the steps of:
    sensing information about the target, which information comprises at least one of (a) position over time and (b) positional angle as a function of time relative to the sensor, coupled with sensor position;
    applying said information to a plurality of filter sets, each filter set including a special filter matched to the parameters of a one predetermined possible type of target and a general filter which is of a more general type, in that the general filter makes no assumptions about the target, for producing, from each of the special and general filters, position, velocity, acceleration, and specific mass flow rate states, and covariances of those states;
    calculating from the states and covariances of each of said set of filters at least (a) estimated actual mass flow rate, (b) estimated thrust, (c) estimated velocity at staging burnout of the current stage, and (d) estimate of remaining burn time for the current stage;
    computing the likelihood that the states and covariances produced by said special and general filters of each of said set of filters represent the same target; and
    selecting from among said plurality of likelihoods, as representing the target, that one of said likelihoods which has the greatest magnitude.

6. A method according to claim 5, wherein said step of calculating from the states includes the step of calculating (e) estimated specific impulse, (f) estimated mass at burnout of the current stage, and (g) estimated initial mass of the current stage.

* * * * *